United States Patent [19]

Glickler et al.

[11] 4,099,853

[45] Jul. 11, 1978

[54] LOW DISTORTION MIRROR FOR HIGH POWER LASER BEAMS INCLUDING A REAR REFLECTIVE SURFACE

[75] Inventors: Sheldon L. Glickler, Natick; Paul G. DeBaryshe, Lincoln, both of Mass.

[73] Assignee: Jersey Nuclear-AVCO Isotopes, Inc., Bellevue, Wash.

[21] Appl. No.: 764,300

[22] Filed: Jan. 31, 1977

Related U.S. Application Data

[63] Continuation of Ser. No. 583,786, Jun. 4, 1975, abandoned.

[51] Int. Cl.² ............................ G02B 5/08; G02B 5/28
[52] U.S. Cl. ...................................... 350/310; 350/166
[58] Field of Search ............... 350/310, 288, 164, 166, 350/295

[56] References Cited

U.S. PATENT DOCUMENTS

| | | | |
|---|---|---|---|
| 1,530,441 | 3/1925 | Thomson | 350/310 |
| 2,552,184 | 5/1951 | Koch | 350/164 |
| 3,836,236 | 9/1974 | Kirk et al. | 350/310 |
| 3,887,261 | 6/1975 | Spiller | 350/164 |

*Primary Examiner*—Jon W. Henry
*Attorney, Agent, or Firm*—Weingarten, Maxham & Schurgin

[57] ABSTRACT

A reflector for a high power laser beam comprising a low absorption, transmitting substrate with a rear reflective coating. The reflector element consisting of the substrate and rear coating is mounted within a housing using low stress supports to prevent deformation of the reflective element and resulting loss in optical beam quality in the reflected laser beam. Coolant is sprayed onto the rear surface of the reflector element preferably in a pattern which modulates the coolant flow volume in accordance with the intensity distribution across the incident laser beam so as to maintain uniform heating in the reflective element and further to prevent distortion in the reflected beam.

21 Claims, 3 Drawing Figures

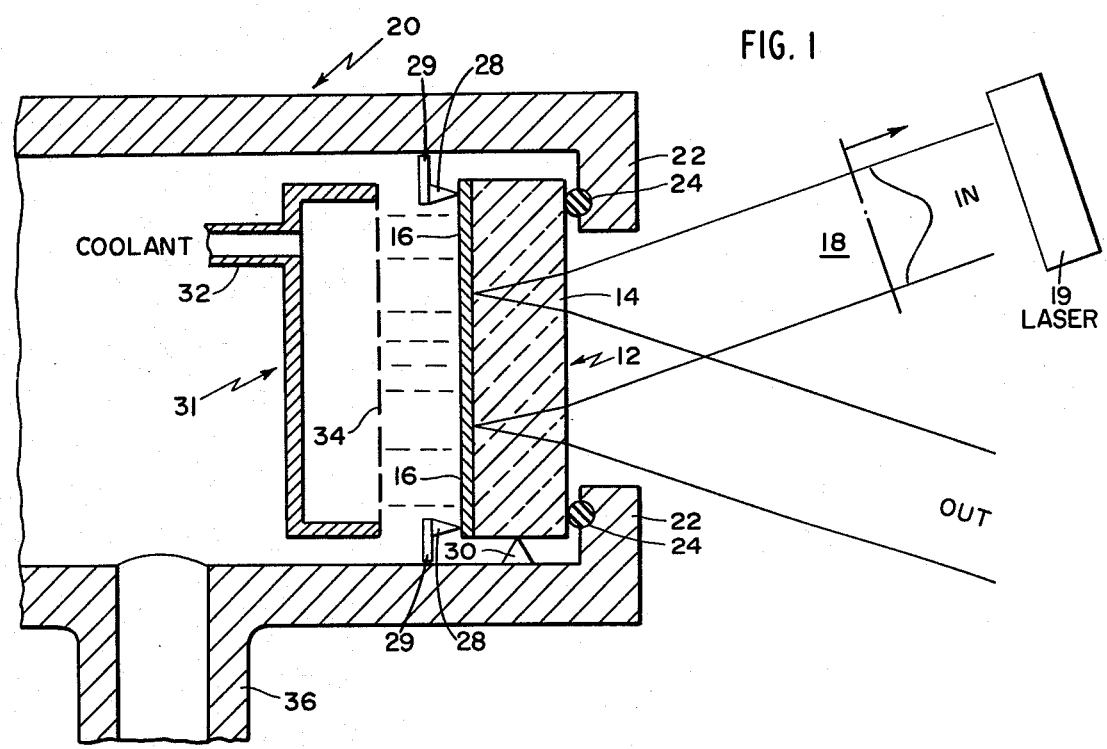
FIG. 1
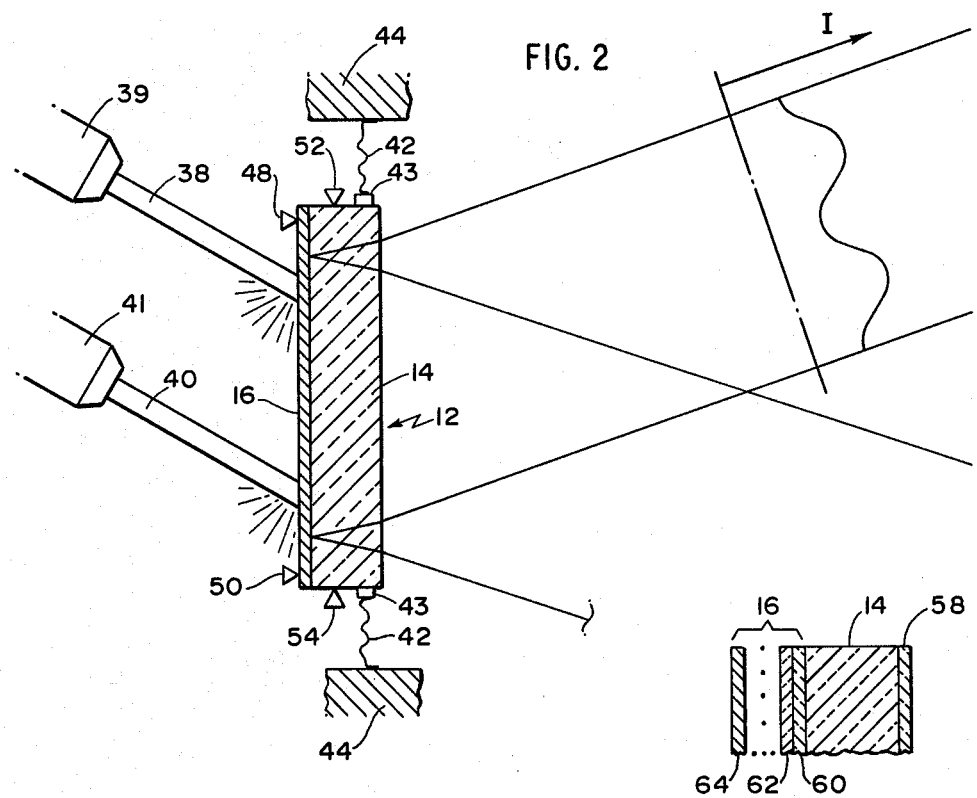
FIG. 2
FIG. 3

LOW DISTORTION MIRROR FOR HIGH POWER LASER BEAMS INCLUDING A REAR REFLECTIVE SURFACE

This is a continuation of application Ser. No. 583,786, filed June 4, 1975 now abandoned.

FIELD OF THE INVENTION

This invention relates to reflectors and in particular a reflector for a high intensity laser beam which maintains laser beam optical quality.

BACKGROUND OF THE INVENTION

In the application of lasers to uranium enrichment, as for example described in U.S. Pat. No. 3,772,519 or U.S. Pat. No. 3,939,354, commonly assigned to the same assignee as the present application, laser beams of very high intensity are ultimately desired for production scale enrichment. Such intensities may run higher than several Kw/cm$^2$. Laser beam reflectors will become a necessary component of an efficient production level enrichment plant for such purposes as providing multiple reflections of the laser beam through each chamber, as illustrated in the above-referenced application, or for directing and guiding the beam throughout the enrichment plant.

The length of travel that an individual laser beam will experience in such a production plant, which is many meters of length, necessitates that the optical quality of the laser beam be maintained high to prevent uncontrollable spreading of the beam that would result in a loss of useful radiation over the extreme lengths to be encountered. The slightest distortion resulting from heating of reflectors carrying such high power densities can rapidly degrade the optical quality of the reflected beam to the point where it becomes difficult or impossible to use it over great distances. It becomes thus important to minimize the amount of energy absorbed as heat within the reflector and to remove as efficiently as possible what heat is absorbed. Under some circumstances it is also necessary to control the points of heat removal.

Conventional front face reflective surfaces are inadequate to this task because front reflection by even a high quality material, involves an inherent absorption due to the material resistivity which cannot be completely eliminated in practice. Also, such a reflective surface must be supported by a substrate which of necessity would remove the reflective surface by some distance from any cooling which could be applied to it.

In addition to uncontrollable expansion, conventional, rigid front surface reflector supports may, in the required high power application, lead to the generation of physical stresses within the reflective element in response to even slight thermal loss from the high power beams. Such stresses will tend to develop further distortions in the reflected beams.

BRIEF SUMMARY OF THE INVENTION

In accordance with the teaching of the present invention, a reflector is provided for high power laser beams which insures the maintenance of relatively high beam quality for efficient use of the laser beam over extremely long beam lengths. The reflector of the present invention comprises a substrate of a low absorption transmitting medium with the reflective element thereof applied to the rear of the substrate as a tuned dielectric layer or combined dielectric and conductive layers rather than a simple conductive coating. The reflector element is preferably mounted in a stress-free manner such as by knife edges and O-rings or bellows within a housing and a spray of a coolant is applied to the rear, coated surface of the substrate in a desired pattern.

Substrates of very low absorption are available, making it practical to pass the beam through the entire substrate for reflection from the rear surface. Additionally, dielectric or combined dielectric/conductive coatings are available which have a much lower loss coefficient than would be available in simple conductive front or rear surface reflective coatings. The result is a very low heat absorption reflective element. In addition, because the reflective surface, the most significant heat absorber, is at the rear of the substrate, and may be very thin, a flow of coolant is applied directly to the reflective interface greatly increasing the efficiency of heat removal. The coolant pattern may be adjusted to provide differing cooling rates over the reflective rear of the substrate to compensate for differing heating rates due to beam intensity variations across the beam. As a result, the temperature distribution of the reflector can be closely controlled and residual distortions minimized.

BRIEF DESCRIPTION OF THE DRAWING

These and other features of the present invention are more fully set forth below in the detailed description of the preferred embodiment and in the accompanying drawing of which:

FIG. 1 is a sectional view of a reflector according to the present invention including a housing and coolant system therefor;

FIG. 2 is an alternate view of a sealing and cooling system for use with the reflector of the present invention; and FIG. 3 is a detailed view of a typical reflecting substrate.

DETAILED DESCRIPTION OF THE PREFERRED EMBODIMENT

The present invention contemplates a reflector system for high intensity laser radiation such as would typically be employed in a production plant for uranium enrichment by isotopically selective photoexcitation. A reflector system of such characteristics as illustrated with respect to FIG. 1 showing a reflective element 12 having a glass substrate 14, typically of fused silica or other low absorptive material. The substrate 14 has a sufficient thickness to width ratio for high optical qualities as is known in the art. The reflective element 12 has a rear coating 16 of one or more dielectric layers which are selected to provide an interface with the substrate 14 that provides nearly complete reflection of the specific one or more frequencies of radiation in a laser radiation beam 18 from one or more lasers 19 incident on the substrate 14. For the purpose of isotopically selective photoexcitation, the radiation in the beam 18 will be typically one or a few specific frequencies selected for their isotopic selectivity and accordingly of very narrow bandwidth. The reflective coating 16 may comprise one or more layers, which may be very thin, on the order of 0.5 to 10 microns, and which are selected to produce the total reflection of the one or more frequencies in the beam 18. The provision of such coatings is a known technology given the specified frequencies in the beam 18. It is important that dielectrics of extremely low loss, as are available, be selected. Also, one or more metallic rear or intermediate layers can be used where the total tuning of the layer structure of coating 16 results in negligible absorption in the metallic layers.

The reflective element 12 is mounted within a housing 20 having a front lip 22 with a pliant seal such as an O-ring 24 set into the inner edge thereof. The reflective element 12 is lightly pressed against the O-ring 24 by knife edges 28 and is vertically supported by a further knife edge 30. The knife edges 28 may be slightly spring loaded as by elements 29 to urge the reflective element 12 into the O-ring seal 24 with only sufficient pressure to provide a coolant seal but not to permit the development of any stress patterns within the reflective element 12. Located behind the reflective coating 16 within the housing 20 is a spray head 31 having an input conduit 32 for coolant and a jet diaphragm 34 with a series of openings therethrough to spray a pattern of coolant over the rear surface 16 of the reflective element 12. The coolant which flows down from the rear surface is drained from the housing through a drain conduit 36 where it may, if desired for lower flow rates, be refrigerated to a predetermined temperature, and returned to the spray head 31 through the conduit 32. It is desired to have a sufficient flow of coolant to maintain the reflective element at a low and/or uniform temperature without providing any additional pressure from the jets of coolant material that would tend to distort the reflective element 12. Such can be readily accomplished within the normal range of jet velocities and flow rates. Typical coolant flow rates per $cm^2$ are approximately 100–3000 cc per second if water is the coolant. Refrigerants may also be used allowing smaller flow rates.

The pattern of spray jets from the head 31 onto the coating 16 of the reflective element 12 is preferentially adjusted to provide a maximum of coolant at portions of the reflective surface where the intensity in the incoming laser beam 18 is at a peak. In the example shown in FIG. 1, the intensity is shown to peak in the center of the beam and diminish toward the edges so that the coolant is applied at a maximum in the center of the reflective element 12. In a further embodiment illustrated in FIG. 2, the incident laser beam 18 has a density distribution which peaks twice across the width of the beam. In this case, separated jets such as jets 38 and 40 from nozzles 39 and 41 are illustrated in FIG. 2 and focus the coolant on those portions of the mirror where the beam intensity is maximum.

Also shown in FIG. 2 is an alternative mounting technique for the reflective element 12. As shown, the seal takes the form of a set of bellows 42 which are secured to the reflective element 12 by a soft glue portion 43 which may comprise optical RTV and to the housing 44 by clamps or other convenient means as may be desired. The bellows 42 are impervious to the coolant employed in the jets 38 and 40.

The mechanical suspension for the mirror 12 in FIG. 2 is provided also by knife edge lateral supports 48 and 50, and top knife edge support 52 and bottom knife edge support 54.

It can be seen from the embodiments of FIG. 1 and FIG. 2 that there is only a slight separation between the reflective interfaces at coating 16 which is the primary heat generator, and the points of application of coolant on the rear surface of the coating 16. This separation is no more than the thickness of the coating 16 which for typical reflective coatings is very slight. An additional thin layer of protective material may be added to the coating 16 as desired to further protect the dielectric in the coating 16 from gradual deterioration by the cooling fluid.

Additionally, because the incident laser beam 18 must pass through the interface between the substrate 14 and air, it may be desirable to employ standard antireflective coatings to eliminate the possibility of reflections at this interface.

FIG. 3 illustrates a reflector as it might appear if the several options described above were employed. An antireflective coating 58 is shown on the front surface of substrate 14 to reduce undesired front surface reflections in the incident beam. The coating 16 includes several dielectric layers such as layers 60 and 62 and possibly a metallic rear layer 64. Layer 64 may alternatively be a protective and nonabrading coating of, for example, silicon dioxide or a metal.

The mirror achieved from the illustrated preferred embodiments in FIGS. 1 and 2 above provides a reflective surface having the capability of handling very high power densities such as on the order of 20 $Kw/cm^2$ without distortions of beam quality in the laser that would make it unsuitable for use in laser enrichment applications requiring an extremely long beam path extending for many meters of length. This advantage is achieved through the combination of very short separation between the point of heat generation in the interface between the coating 16 and substrate 14 and the point of coolant application on the other side of the coating 16. A very low stress mounting for the reflector further prevents any thermal expansion or contraction resulting from the operation of the reflector at very high incident beam intensities from producing stresses within the substrate 14 that would result in beam distortion.

The above description is intended to be exemplary only and accordingly modifications to the disclosed structure are contemplated within the spirit and scope of the present invention as defined in the following claims.

What is claimed is:

1. A reflector comprising:
   a reflective element having:
   a transparent substrate having a low absorption to radiation of at least one predetermined frequency; and
   a coating on a first surface of said substrate defining a rear reflective coating and tuned to provide reflection of said at least one predetermined frequency when passing through said substrate from a second surface thereof opposite to said first surface;
   means for mounting said reflective element to expose the second surface thereof whereby a radiation may be received thereon for reflection of the radiation from said rear reflective coating;
   said mounting means mounting said reflective element substantially free to expand to relieve stress therein; and
   cooling means for applying a cooling fluid directly to the first surface of said reflective element having said rear reflective coating thereon.

2. The reflector of claim 1 further including:
   means for applying a laser beam of one or more predetermined frequencies to the second surface of said substrate directed toward said rear reflective coating; and
   said rear reflective coating including one or more dielectric layers selected to provide total reflection of the one or more frequencies in said laser beam.

3. The reflector of claim 1 wherein said substrate material comprises fused silica.

4. The reflector of claim 1 further including:
a housing for said reflective element and having an opening to expose the second surface of said reflective element;
said cooling means including means for applying a pattern of coolant onto the rear reflective coating of said reflective element;
a coolant seal between said housing and said reflective element to seal the coolant applied to the rear reflective coating of said reflective element from the exterior of said housing.

5. The reflector of claim 4 wherein said sealing means includes an O-ring seal between said housing and said reflective element.

6. The reflector of claim 4 wherein said sealing means includes a bellows connected between said housing and said reflective element.

7. The reflector of claim 4 wherein said mounting means includes a plurality of knife edges supporting said reflective element within said housing and against said sealing means.

8. The reflector of claim 4 wherein:
means are provided for applying a laser beam to the second surface of said reflective element in a nonuniform intensity distribution in the plane of said laser beam transverse to the direction of radiation; and
said cooling means applies a pattern of coolant on the coated surface of said reflective element which provides maximum cooling at portions where peak laser beam intensity is incident upon the reflective coating.

9. The reflector of claim 1 wherein said rear reflective coating includes plural dielectric layers.

10. The reflector of claim 9 wherein said rear reflective coating includes at least one metallic layer.

11. The reflector of claim 1 wherein said at least one predetermined frequency is narrowly defined for isotopically selective excitation and said rear reflective coating is tuned with said substrate material to provide reflection at said at least one predetermined frequency.

12. The reflector of claim 1 further including a protective coating on said rear reflective coating.

13. The reflector of claim 1 further including a front dielectric coating on the second surface of said transparent substrate to reduce reflection of the at least one predetermined frequency at the second substrate surface.

14. The reflector system of claim 1 wherein said mounting means includes a knife edge support and a pliant seal with said reflective element therebetween.

15. The reflector system of claim 14 wherein said pliant seal comprises a gasket.

16. The reflector system of claim 15 wherein said gasket is an O-ring.

17. The reflector system of claim 14 wherein said pliant seal includes a bellows.

18. The reflector system of claim 1 wherein said mounting means includes knife edge vertical and horizontal supports for said reflective element.

19. The reflector system of claim 1 wherein said mounting means includes point contact vertical and horizontal supports for said reflective element.

20. The reflector system of claim 1 wherein said mounting means includes a point contact edge support and a pliant seal with said reflective element therebetween.

21. A reflector comprising:
a reflective element having:
a transparent substrate having a low absorption to radiation of at least one predetermined frequency; and
a coating on a first surface of said substrate defining a rear reflective coating and tuned to provide reflection of said at least one predetermined frequency when passing through said substrate from a second surface thereof opposite to said first surface;
means for mounting said reflective element to expose the second surface thereof whereby a radiation may be received thereon for reflection of the radiation from said rear reflective coating;
said mounting means mounting said reflective element substantially free to expand to relieve stress therein; and
cooling means for spraying a cooling fluid directly to the first surface of said reflective element having said rear reflective coating thereon.

* * * * *